United States Patent [19]
Wills

[11] Patent Number: 6,052,376
[45] Date of Patent: *Apr. 18, 2000

[54] DISTRIBUTED BUFFERING SYSTEM FOR ATM SWITCHES

[75] Inventor: Jeffrey M. Wills, Fairfax, Va.

[73] Assignee: Hyundai Electronics America, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,536

[22] Filed: Dec. 30, 1996

[51] Int. Cl.[7] .............................. H04L 12/28; H04L 12/56
[52] U.S. Cl. .......................... 370/419; 370/235; 370/412; 370/413
[58] Field of Search .................................. 370/235, 236, 370/360, 362, 363, 395, 412, 413, 468, 321, 415, 417, 429, 430

[56] References Cited

U.S. PATENT DOCUMENTS

| | | | |
|---|---|---|---|
| 5,271,000 | 12/1993 | Engbersen et al. | 370/395 |
| 5,321,691 | 6/1994 | Pashan | 370/395 |
| 5,325,089 | 6/1994 | Goeldner | 370/395 |
| 5,361,255 | 11/1994 | Diaz et al. | 370/413 |
| 5,367,520 | 11/1994 | Cordell | 370/395 |
| 5,436,886 | 7/1995 | McGill | 370/395 |
| 5,455,820 | 10/1995 | Yamada | 370/413 |
| 5,457,687 | 10/1995 | Newman | 370/232 |
| 5,461,615 | 10/1995 | Henrion | 370/395 |
| 5,493,566 | 2/1996 | Ljungberg et al. | 370/413 |
| 5,537,402 | 7/1996 | Notani et al. | 370/395 |
| 5,544,160 | 8/1996 | Cloonan et al. | 370/395 |
| 5,550,823 | 8/1996 | Irie et al. | 370/413 |
| 5,568,477 | 10/1996 | Galand et al. | 370/229 |
| 5,583,861 | 12/1996 | Holden | 370/395 |
| 5,583,868 | 12/1996 | Rashid et al. | 370/394 |
| 5,633,870 | 5/1997 | Gaytan et al. | 370/235 |
| 5,650,993 | 7/1997 | Lakshman et al. | 370/236 |

*Primary Examiner*—Dang Ton
*Assistant Examiner*—Phirin Sam
*Attorney, Agent, or Firm*—Townsend and Townsend and Crew LLP

[57] ABSTRACT

The present invention provides for an ATM switch for transferring ATM cells from input channels to output channels. The switch has a plurality of input and output ports, each connected to input and output channels respectively. The ATM switch also has a switch block connected between each one of the input ports and each one of the output ports to convey the cells from the input ports to the output ports, and a backpressure signal circuit. Each input port has an input buffer which holds cells which arrive faster from an input channel than the input port can transmit to the switch block, and each output port has an output buffer holding cells when the cells arrive faster from the switch block than the output port can transmit. The backpressure signal circuit sends a signal from a congested output buffer to those input port buffers which have transmitted a cell to the output buffer (during congestion) so that the input port buffers cease transmission. The cells destined for the output buffer are then stored in the input port buffers.

4 Claims, 4 Drawing Sheets

DISTRIBUTED BUFFERING SYSTEM FOR ATM SWITCHES

BACKGROUND OF THE INVENTION

This invention relates to communication networks and, in particular, to switches in an asynchronous transfer mode (ATM) network.

In a communication network, units of data must be routed between different points of the network through switches. In ATM networks, traffic streams of mixed types of information are carried according to the concept of "bandwidth on demand." The data units, ATM cells, are transferred in accordance with the varying requirements of each ATM cell. Data units which are time critical are given priority in network routing. Data units which are information critical are given priority against cell loss. This ability to handle video, voice, computer data and other information has led to the wide acceptance of ATM as a prospective network standard.

An ATM network switch must route information reliably with minimum delay and loss, but the wide variation in requirements in ATM networks creates heavy demands upon the ATM switch. In particular, previous designs have placed a buffer at each output port of the ATM switch to store cells arriving faster than the output port can transmit to its output channel. The buffers created operational tolerance to differing demands on the ATM switch to avoid losing cells. A variation of this concept has been to place a storage buffer which is commonly used by all the output ports of the ATM switch.

These different designs have various shortcomings, including complexity, high cost, and impediments to configuration changes. Another shortcoming is that the simple buffering at the output port set a limit on the amount of buffering available to the output port. However, the probability of congestion at an output port is directly related to the number of input ports feeding the output port. As more input ports are added to the ATM switch, the probability of overwhelming an output buffer increases. For the design with a common buffer shared by all the output ports, performance is often not better. If enough data arrives at an output port, a large fraction of the common buffer is occupied by the cells destined for the output port and is unavailable to the other output ports. This can cause problems, particularly in networks with multiple servers.

The present invention solves or substantially mitigates these problems with an ATM switch which has buffering distributed for higher performance and which allows for greater modularization of design.

SUMMARY OF THE INVENTION

The present invention provides for an ATM switch for transferring ATM cells from a plurality of input channels to a plurality of output channels. The switch has a plurality of input and output ports, each connected to input and output channels respectively, a switch block connected between each one of the input ports and each one of the output ports, and a backpressure signal circuit. Each input port has an input buffer that holds cells which arrive faster from an input channel than the input port can transmit to the switch block, and each output port has an output buffer holding cells when the cells arrive faster from the switch blocks than the output port can transmit. The switch block conveys the cells from the input ports to the output ports. The backpressure signal circuit sends a signal from a congested output buffer to those input port buffers which have transmitted a cell to the output buffer (during congestion) so that the input port buffers cease transmission. The cells destined for the output buffer are then stored in the input port buffers.

BRIEF DESCRIPTION OF THE DRAWINGS

The invention may be better understood by reference to the following detailed description in connection with the accompanying drawings.

DETAILED DESCRIPTION OF SPECIFIC EMBODIMENTS

Figure 1:
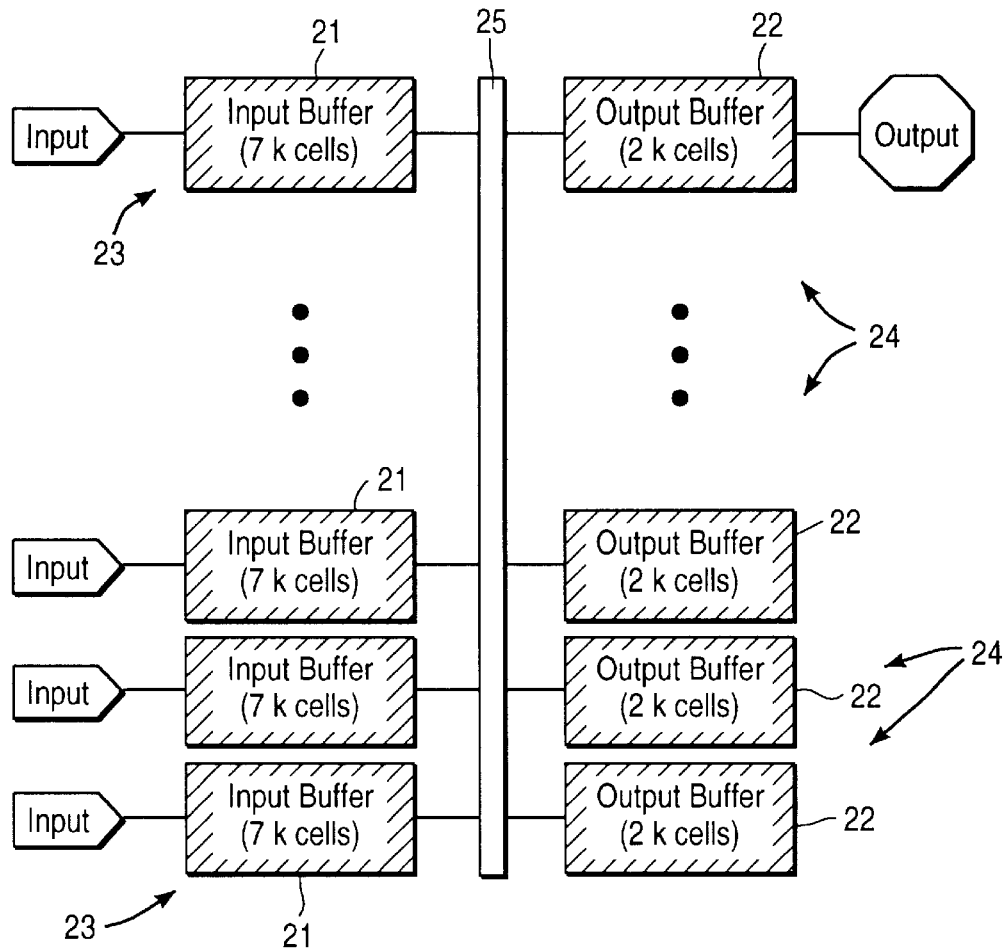
FIG. 1 is a representation of the distributed buffering of an ATM switch according to the present invention.

The general organization of an ATM switch and its distributed buffering system according to one embodiment of the present invention is illustrated in FIG. 1. Each input channel is connected through an input port 23 with an input buffer 21 and each output channel is connected through an output port 24 with an output buffer 22. The input buffers 21 and output buffers 22 are connected to a switch block 25 by which incoming ATM cells are routed from an input buffer 21 to the proper output buffer 22 (and output port). Cells enter the ATM switch though one of the input ports 23. If the switch block 25 is not congested, cells are transferred through the switch block 25 to one or more output ports 24. If the output port 24 is not already transmitting a cell, then the arriving cell proceeds directly through the output port 24 to the connected output channel. Otherwise, the cell is held in the output buffer 22 until the output port 24 is ready to transmit the cell to the output channel.

Cells from multiple input ports 23 can converge upon the same destination output port 24 to cause its output buffer 22 to become congested and overflow. A backpressure signal circuit (not shown in this drawing) is operative at this point. If an input buffer 21 transmits a cell to a congested output buffer 22, the backpressure signal circuit sends a halt signal to that input buffer 21 so that port 23 stops sending cells. Cells arriving from the input channel of that port 23 are stored in the input buffer 21 of that port 23. When the congested output buffer 22 empties below a predetermined threshold, i.e., the buffer 22 is no longer congested, the backpressure signal circuit removes the halt signal to the input buffers 21 previously halted to resume transmission to the switch block 25.

With this distributed buffering system, the input buffers 21 can jointly store cells destined for a common output port 24 with a congested output buffer 22. This allows the amount of buffering available for each output port 24 to grow with the number of input ports 22, the source of congestion.

Figure 2:
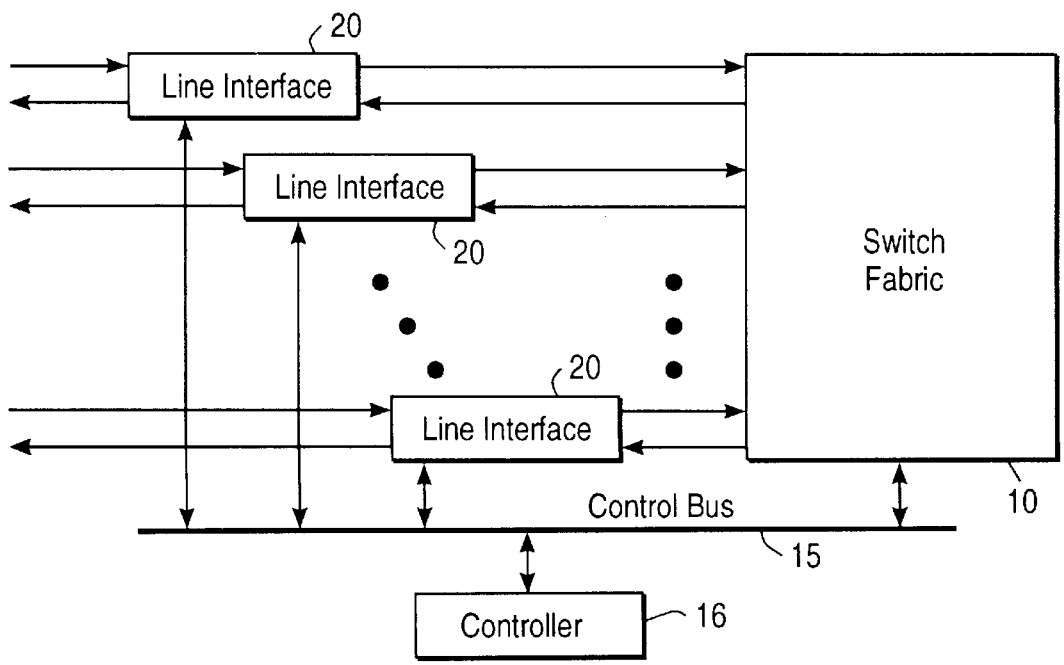
FIG. 2 is a block diagram of the general organization of an ATM switch according to an embodiment of the present invention.

The details of a particular embodiment of an ATM switch according to the present invention are illustrated in FIG. 2. The input ports 23 and output ports 24 are integrated into line interface modules 20, each of which is connected to several input and output channels. While a time-division multiplexed bus could also be used for the switch block 25, a switch fabric 10 having multiple switching elements is considered highly suited for the ATM switch described below.

The ATM cells traveling through an ATM network enter through a line interface module 20, route through the switch fabric 10, and exit to the network through another module 20. The switch also has a controller unit 16 which communicates with the modules 20 and switch fabric 10 through a control bus 15. The controller unit 16 configures and monitors the line interface modules 20 and the switch fabric 10.

The controller unit 16 provides all call access control functions, including call setup, maintenance, and teardown, and processes the information measured by the line interface modules 20 to maintain connection and link statistics for network management. Operationally, signaling and management cells are transmitted to and from the controller unit 16. These cells are received by the unit 16 after they pass through the switch fabric 10 to an output module 20. The signaling and management cells are removed from the output module 20 and sent to the controller unit 16 through the control bus 15. The controller unit 16 transmits signaling and management cells to the network by sending these cells to an input module 20 by the bus 15. The cells are routed through the fabric 10 to an output module 20 and transmitted to the network.

By passing such control information for the controller unit 16 through the switch fabric 10 first before the information reaches the controller unit 16, or before the information generated by the controller unit 16 leaves the switch, multiple controller units 16 can each monitor a fixed number of line interface modules 20 with call control and network management messages passed through a central processor when the switch architecture is expanded to a larger number of ports. This modularity in control and network management design permits for ready expansion of the ATM switch. Control and management processing capacity, i.e., the control units 16, is added with more switching capacity, i.e., the line interface modules 20.

The line interface modules 20 support all the by-line and by-connection functions, the physical layer link termination, translation of ATM cell header information into routing tags for use by the fabric 10, traffic policing, cell rate decoupling, including the insertion and deletion of unassigned cells. Each module 20 also measures cell loss, cells tagged, cells passed and the number of cells dropped for each connection. On the other hand, the switch fabric 10, which routes cells received from a module 20 to one or more modules 20, maintains queue-level statistics on congestion by the measurement of the number of cells during which backpressure (described below) is applied, and the amount of cell loss.

Each line interface module 20 form four input ports 23 and four output ports 24 of the ATM switch, with each input buffer 21 connected to a communication line from which ATM cells are received. Each output buffer 22 of an output port 24 is connected to a communication line to which cells are transmitted.

The large amount of buffering capability of the ATM switch is distributed between the line interface modules 20 operating as an input module and output module, and some buffering in the switch fabric 10. As indicated in FIG. 1, each input buffer 21 has the capacity to hold 7,000 cells and each output buffer 22 has the capacity to hold 2,000 cells for the particular ATM switch described. The buffering minimizes cell loss for bursty traffic, while avoiding delay for time-critical data. The switch drops cells on a per-connection basis, rather than on cell priority level. The sender(s) of the congestion-causing data is penalized, rather than the other users of the ATM switch.

Though much smaller than the input and output buffers, the buffering in the switch fabric 10 allows cells to continue to move through the switch fabric 10 when there is contention between cells for the same output port. The large buffering in the modules 20 operate when there is congestion caused by bursts of cells from different connections headed for the same destination (port).

Figure 3:
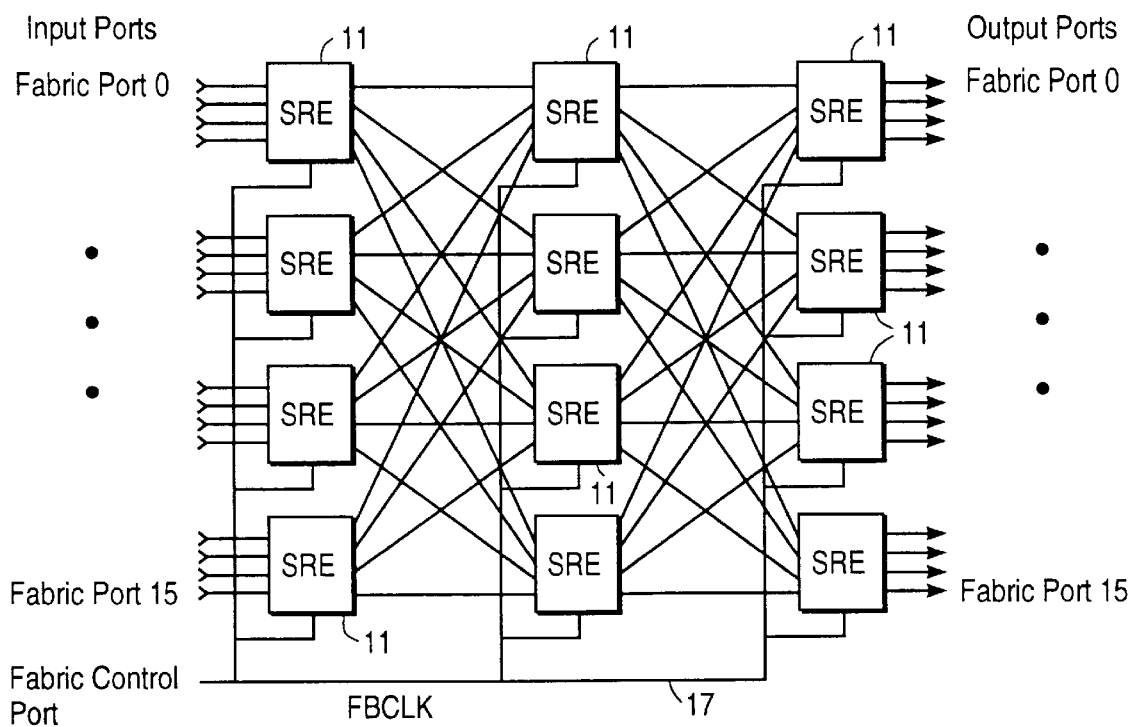
FIG. 3 is a block diagram of the switch fabric of the ATM switch of FIG. 2.

The switch fabric 10 is detailed in FIG. 3. The fabric 10 is a 16-port buffered Benes interconnection network with 4×4 switch routing elements 11. That is, each switch routing element 11 has 4 input ports and 4 output ports. As shown in FIG. 3, the leftmost column of elements 11 are each connected to the input ports of a line interface module 20. The four output ports of each of these elements 11 are, in turn, connected to input ports of the middle column of elements 11. The output ports of the middle column of elements 11 are connected to the input ports of the rightmost column of switch routing elements 11. The output ports of these elements are connected to the output ports of the line interface modules 20.

An element 11 routes each individual ATM cell from one of its input ports to the proper output port(s) by the bits within the routing tag of the cell header. A fabric control bus 17, which is directly connected to the control bus 15, allows the controller unit 16 to program the elements 11 and to read their status. A fabric base clock (FBCLK) signal sets the rate at which the cells are acted upon by the elements 11 for transfer through the switch fabric 10 from element 11 to element 11. This determines the internal link rate of the fabric 10.

Figure 4:
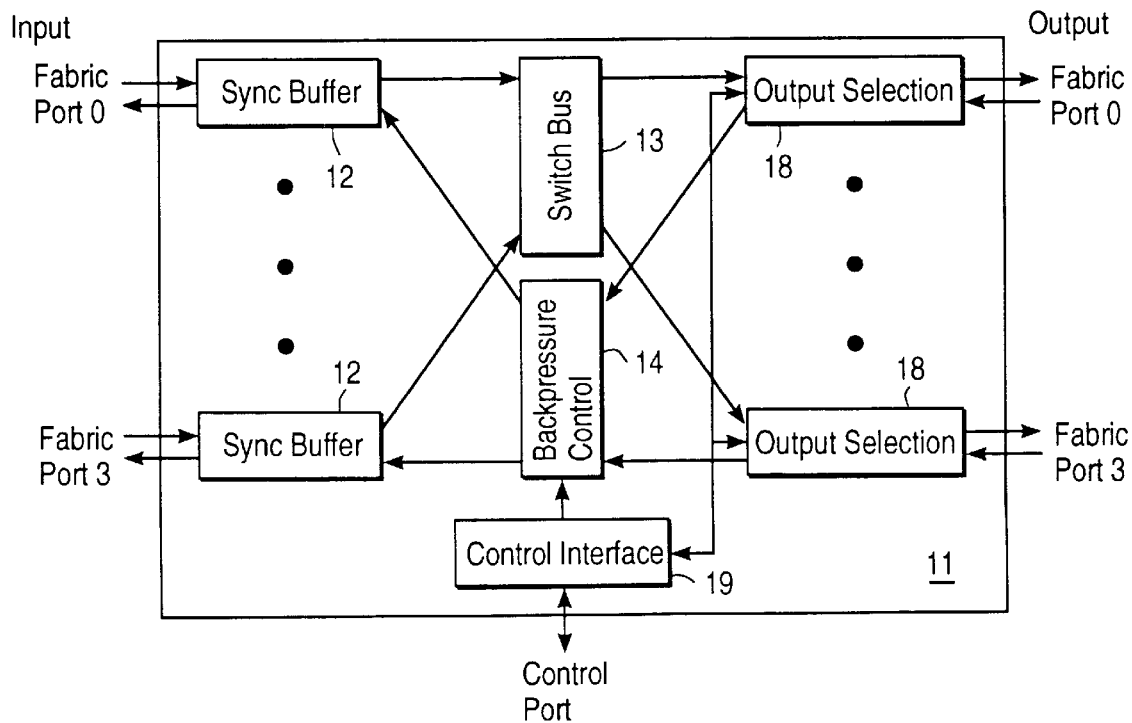
FIG. 4 is a block diagram of the elements of a switch routing element of the switch fabric of FIG. 3.

The elements of each switch routing element 11, a fully 4×4 non-blocking element, is shown in FIG. 4. Each element 11 has four sync buffers 12, each connected to an output port of a line interface module 20 or of another switch routing element 11. The sync buffers 12 are connected to switch bus 13, which is in turn connected to four output selection blocks 18. Each output selection block 18 is capable of holding 32 cells, while a sync buffer 12 can hold 2 cells. Hence each switch routing element 11 can hold up to 136 cells at a time. To handle congestion problems, the switch routing element 14 has a backpressure control block 14 which can receive backpressure signals from each one of the output selection blocks 18 and pass on the backpressure signals to each one of the sync buffers 12, as described below. A control interface block 19 handles control and signaling functions for the element 11 through a control port which is connected to the control fabric bus 17.

Figure 5:
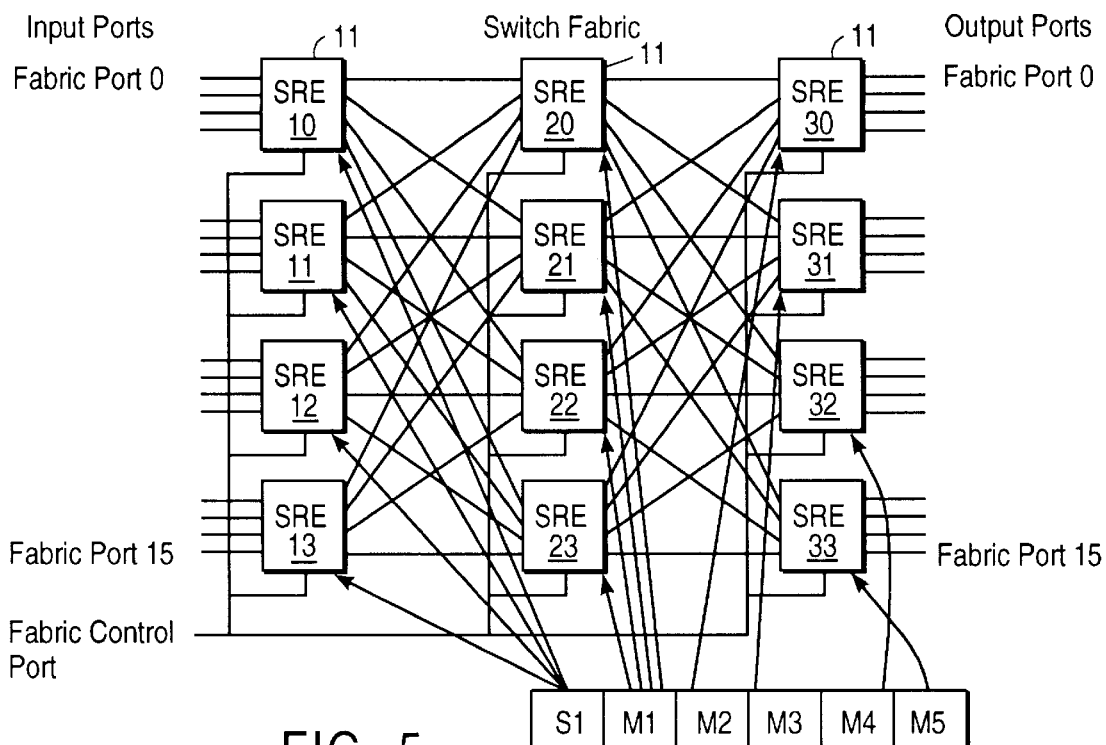
FIG. 5 illustrates the mapping of routing tag fields to switch routing elements in the switch fabric of FIG. 3.

Cells are clocked into a sync buffer 12 at the rate the cells are transmitted into the element 11. The cells from the four sync buffers 12 are multiplexed through the switch bus 13. The output selection blocks 18 read the routing tags for each cell, and route the cells towards their respective output ports. Each output selection block 18 reads either a multicast routing field ('M' field) or unicast routing field ('S' field) in the cell header. The mapping of switch routing element position to the routing tag field is shown in FIG. 5.

The first stage of the switch routing elements 11 in the switch fabric 10 are all programmed to read the S field. These switch routing elements 11 can use the same routing tag field, as the cells which pass through them all come from different sources. Furthermore, the value of the S field uniquely determines to which second stage switch routing elements 11 the cell will go. The cells are routed to the switching element output as described in the table below.

| S field value | Output Port |
| --- | --- |
| 0 | 0 |
| 1 | 1 |
| 2 | 2 |
| 3 | 3 |

A cell with the value '1' in the S field is routed to port 1 by a switch routing element 11 in the first stage. This cell travels to the switch routing element '21', regardless of which switch routing element routed the cell in that direction.

The second stage of switch routing elements 11 also use the same field. However, these switch routing elements 11 must be capable of routing the cells to multiple switch routing elements 11 in the third stage so that these switch routing elements are programmed to read an M (or multicast) field in the routing tag, i.e., the field M1 in the routing tag illustrated in FIG. 5.

In an M field, a value of '1' in each individual bit of the field indicates to the output selection block 18 that the cell is destined for its output port. The mapping is as shown below:

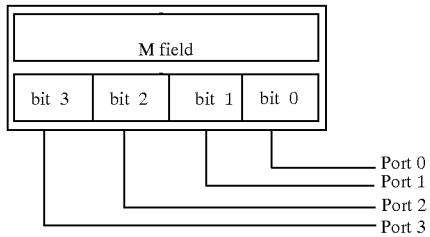

Thus if a cell with the bit pattern, '1011' in the M1 field, arrives at a switching element 11 in the second stage of the fabric 10, the output selection block 18 for ports '0', '1', and '3' copy the cell from the switching bus into the buffer within the output selection block 18. The copies of the cell are eventually transmitted through the output ports '0', '1' and '3' to the switching elements '30', '31' and '33' in the third, and last, stage of the switch fabric 10.

The switch routing elements 11 in the third stage of the switch fabric 10 route cells directly to the outputs of the switch fabric 10 itself. For multicasting capability, these switching elements 11 are programmed to use the 'M' (multicast) fields in the routing tags of the cell headers. Furthermore, it is desirable to be able to route only the cells to any combinations of the output ports. Since each of the last stage switching elements 11 are only connected to four of the switch fabric output ports, each of the third stage switching elements 11 must have a distinct 'M' field in the routing stage. Thus the switching elements '30', '31' '32', and '33' are programmed to read fields 'M2', 'M3', 'M4', and 'M5', respectively. The operation of these fields is exactly the same as for the 'M1' field.

Figure 6A:
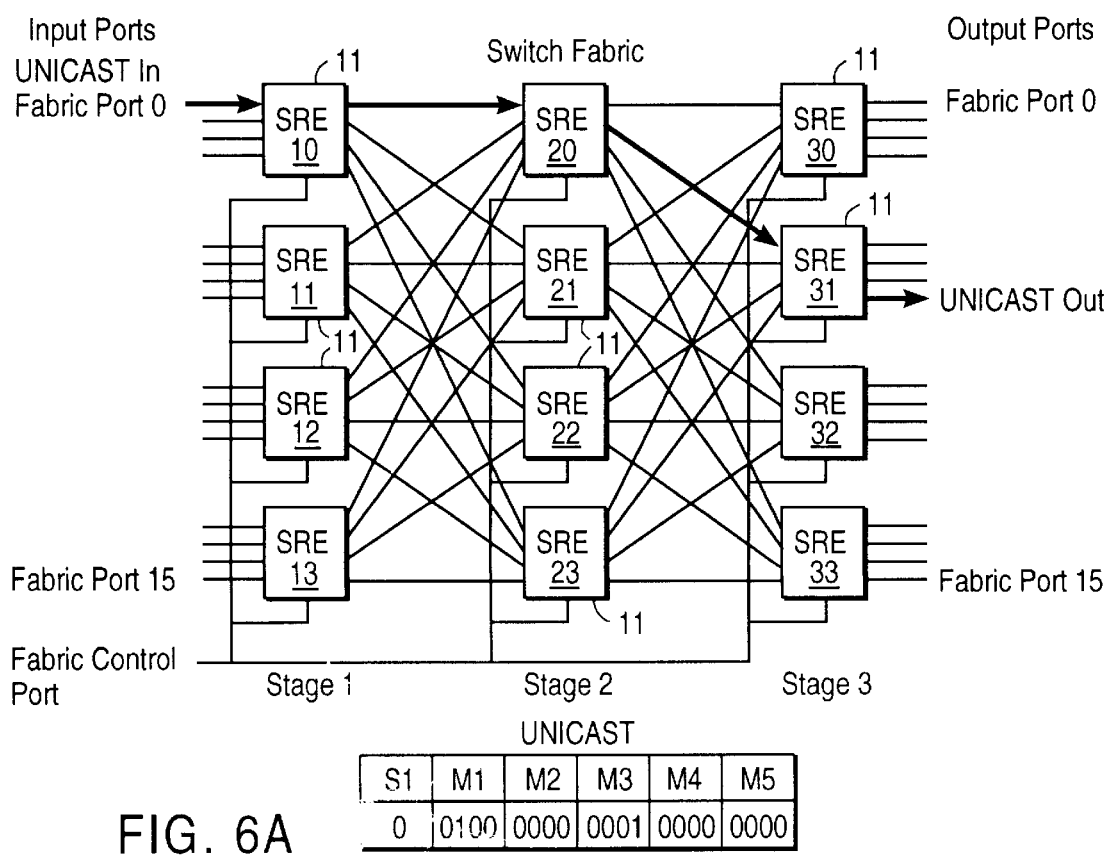
FIG. 6A illustrates the cell path of a unicast connection in the switch fabric for exemplary values in the routing tag field.
Figure 6B:
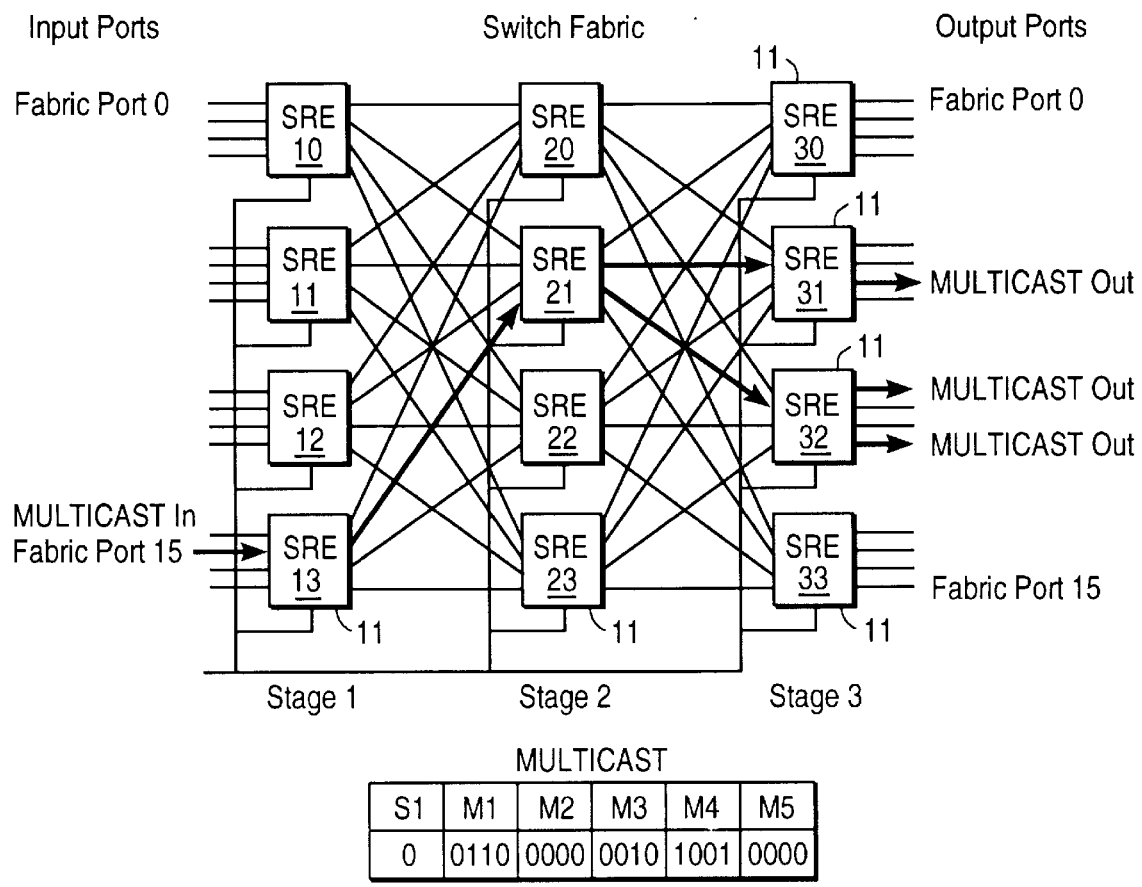
FIG. 6B illustrates the cell path of a multicast connection in the switch fabric for exemplary values in the routing tag field.

FIGS. 6A and 6B illustrate the routing path through the switch fabric 10 for a unicast connection, and for a multicast connection, respectively, for exemplary routing tags. The darkened lines between the switch routing elements 11 of the various stages illustrate the routing of the cell.

Figure 7:
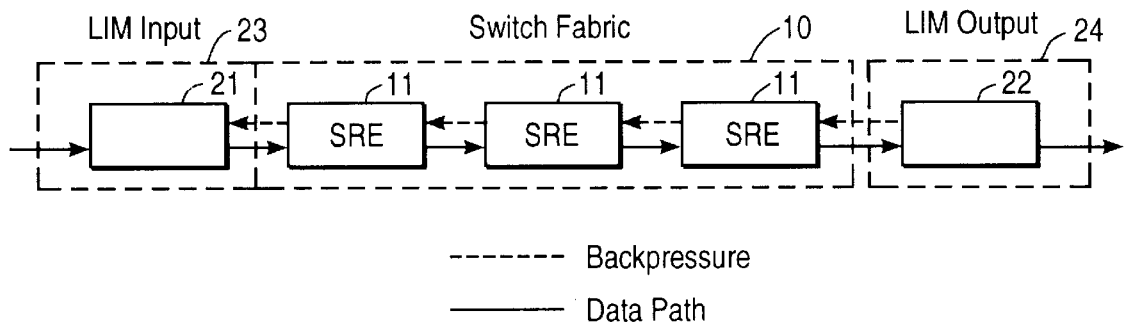
FIG. 7 is a representative diagram of the backpressure control block of the switching routing element of FIG. 5.

Cells are lost in transmission if the destination buffer of the cells has overfilled so that it can no longer store more cells. To lessen these occurrences, the buffers in the ATM switch cooperate through a backpressure signal circuit. A backpressure signal, an Overfill signal, is applied by a destination buffer to any source, either a line interface module 20 or a switch routing element 11 which attempts to send a cell to the buffer which has become congested, i.e., filled past a predetermined threshold. FIG. 7 is a representative diagram illustrating the path of an incoming cell from an input channel to an input buffer 23, through the three stages of switch routing elements 11 in the switch fabric 10, and an output buffer 24 connected to an output channel. Parallel to the data connections for transferring cells through the ATM switch, there is a backpressure signal connection for each buffer to send an Overfill signal back to a cell source.

Each output buffer 24 can issue an Overfill signal to the four connected switch routing elements 11 in the third stage of the switch fabric 10. Each of the third stage elements 11 can issue an Overfill signal to the four connected switch routing elements 11 in the second stage, while each second stage element 11 can issue an Overfill signal to the four connected switch routing elements 11 in the first stage. Each first stage element 11 can issue an Overfill signal to the output buffers 23 of the four connected input ports 23. The Overfill signal is directed by the congested destination buffer to the particular source which sent the cell. The Overfill signal disables off the transmission capability of the source; transmission can resume when the destination buffer has transmitted its congested cells and enables the transmission capability of the disabled sources.

In the switch routing elements 11 of the switch fabric 10, the output selection block 18 sends an Overfill signal to the backpressure control block 14 if its buffer of the block 18 fills beyond a threshold. Upon receiving the backpressure signal, the backpressure control block 14 routes the signal to one (or more) sync buffers 12 which attempt to send cells to the congested output selection block 18. The cell is not read from the sync buffer 12 and the cells in the sync buffer 12 remains there until the next time that input port is selected. The status of the buffer of the output selection block 18 is checked again. The process is repeated until the buffer has room for the cell.

Note that while the backpressure signal circuit pressure circuit couples the buffers 22 of the output ports 24 to the buffers 21 of the input ports 23 through the switching fabric 10, one can appreciate a backpressure signal circuit which couples the buffers 22 and 24 directly. This is true when the switch block 25 between the buffers 22 and 24 have no buffering capability, such as a time-division multiplexed bus. Of course, time delays in the travel of a cell between an input buffer 22 and an output buffer 24 are accounted for by the backpressure signal circuit by setting the threshold below the normal rate.

In most applications the ATM switch is effectively output-queued in that if the instantaneous bandwidth of multiple connections en route to the same output port exceeds the output line rate, the output buffer 22 of the line interface module 20 begins to fill. When that buffer 22 has filled, a backpressure signal is sent to the previous switch element 11 in the switch fabric 10. The switching elements 11 propagate the backpressure signal back towards the source if their buffers fill up. Finally, the input buffer 21 of the module 20 receives a backpressure signal so that it begins to fill. The current sizing of the buffers 21 and 22 enables the switch to handle bursts of data up to 5 milliseconds (at 622 Mbps), which is very useful in carrying data traffic between file servers and clients, or between nodes in a distributed computing environment.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. An ATM switch for transferring cells from a plurality of input channels to a plurality of output channels, said switch comprising a plurality of input ports, each input port connected to one of said input channels and receiving cells from said one input channel, said input port having an input buffer holding cells when said cells arrive faster from said input channel than said input port transmits;

a plurality of output ports, each output port connected to one of said output channels and transmitting cells to said one output channel, said output port having an output buffer holding cells when said cells arrive faster from said input ports than said output port transmits;

a switch block connected between each one of said input ports and each one of said output ports, said switch block conveying cells from said input ports to said output ports, said switch block having a plurality of interconnected switch elements, each switch element having a plurality of input terminals, a plurality of output terminals and a switch bus, each input terminal having an input buffer holding cells received by said input terminal, each output terminal having an output buffer holding cells to be transmitted by said output terminal, and said switch bus transmitting cells from said input terminals to said output terminals; and a backpressure signal circuit connected between each output buffer of each output port and each input buffer of each input port, said backpressure signal circuit sending a signal from a congested output buffer to those input port buffers which had immediately transmitted a cell to said output buffer so that said input port buffers cease transmission so that cells destined for said output buffer are stored in said input port buffers.

2. The ATM switch of claim 1 wherein said input port and output port buffers have a capacity exceeding that of said switch element buffers by at least an order of magnitude.

3. An ATM switch of claim 1 wherein each input port buffer has a capacity of approximately 7,000 cells.

4. The ATM switch of claim 3 wherein each output port buffer has a capacity of approximately 2,000 cells.

* * * * *